United States Patent Office 3,268,346
Patented August 23, 1966

3,268,346
PREPARATION OF DRIED EGG
Arnold Spicer and William Herbert Sly, both of Edric House, Castle St., High Wycombe, England
No Drawing. Filed Dec. 9, 1963, Ser. No. 329,275
Claims priority, application Great Britain, Jan. 22, 1963, 2,690/63
8 Claims. (Cl. 99—210)

This invention has reference to a process for preparing dried egg. The general object of the invention is to prepare liquid egg (which is an emulsion of the egg white and egg yolk) in a manner which will have the effect of preventing undesirable changes in the egg during its subsequent use in baking and particularly during the drying process. In attaining this general object the egg product treated according to the invention is particularly valuable for use in the bakery trade, such as in cake making, as it ensures maximum volume in the batter and finished cake, and after baking promotes a fine stable crumb structure, tender eating qualities, and pleasing appearance. Moreover the invention prevents removal of the water of crystallisation during drying, thus preserving the monomolecular layer of moisture in the dried product and promoting rapid and ready re-hydration of the dried product.

The chemistry and physical chemistry of egg is very complex, and is still not completely understood, but it may be said that the principal adverse changes which are liable to take place particularly during drying are (a) denaturing of the egg proteins by heat, and (b) breakdown of the yolk emulsion. It has been realised by the present invention that the splitting of the protein-fat complex in the yolk (with liberation of free oil) particularly during the process of drying can be prevented by treating the liquid egg with a suitable and balanced combination of emulsifying and stabilising agents. It is a well known fact that the presence of small traces of free oil or fat will completely spoil the whipping character and other desirable qualities of egg. The liquid egg before drying represents an oil-in-water emulsion, water being the continuous phase, whilst after drying, all but about 3% of the moisture having been removed, the dried product contains a water-in-oil emulsion. Therefore, it becomes imperative to provide a combination of different types of emulsifying agents, one to promote the water-in-oil phase and the other one the oil-in-water phase to obtain the best results.

According to the invention, a process for the preparation of a foodstuff intermediary comprises adding to liquid egg an emulsifying agent consisting of a mixture of at least one mainly hydrophilic emulsifier and at least one mainly lipophilic emulsifier in aqueous emulsion to promote and stabilise in liquid egg the oil-in-water emulsion formation whilst at the same time promoting and stabilising the water-in-oil emulsion formation in dried egg prepared therefrom.

This strengthens the complex egg structure and prevents splitting off of free oil from the yolk particles particularly during drying. Emulsifiers of the oil-in-water promoting type, or mainly so, are referred to herein as hydrophilic (water loving) and those of the mainly water-in-oil promoting type, are referred to as lipophilic (oil-loving).

It is preferred, although not essential, to include also at least one "intermediate" emulsifier having fairly balanced water-in-oil and oil-in-water promoting properties as a bridge serving to promote affinity between the foregoing two types.

Examples of hydrophilic emulsifiers suitable for the invention are mono-glyceryl esters, e.g. glyceryl monostearate, self-emulsifying and glyceryl mono-oleate self-emulsifying, or the polyhydric alcohols, e.g. propylene glycol; for the lipophilic emulsifier a glyceryl diester is suitable, e.g. glyceryl dioleate; another lipophilic emulsifier is sorbitan dioleate. Suitable intermediate emulsifiers can be found among polyoxyethylene derivatives (such as polyoxyethylene sorbitan mono-oleate). Sorbitan diacetyl tartaric acid is another suitable intermediate emulsifier.

The presence of such a mixture of emulsifying and stabilising agents in the egg brings about a gradual transition from hydrophilic to lipophilic properties. In a typical instance the transition might be from propylene glycol through glyceryl monostearate and polyoxyethylene sorbitan mono-oleate to glyceryl dioleate.

Some examples of the invention are as follows:

Example 1

An emulsifying agent is first prepared by making an emulsion of the following constituents:

| | | |
|---|---|---|
| Glyceryl monostearate (self-emulsifying) | grams | 65 |
| Glyceryl dioleate | do | 20 |
| Polyoxyethylene sorbitan mono-oleate | do | 2 |
| Propylene glycol | do | 5 |
| Water | mls | 800 |

This emulsion, constituting an emulsifying agent for the egg, is prepared by melting together the glyceryl esters, mixing in the polyoxyethylene sorbitan mono-oleate and propylene glycol and then adding the water at just below its boiling point with rapid stirring. The mixture is then cooled with constant stirring until a smooth creamy emulsion is produced.

13.5 kilograms of liquid whole egg is then placed in a suitable mixer and agitated until the yolks and whites are completely mixed. The emulsifying agent is then added slowly with constant stirring until a smooth, completely homogeneous emulsified liquid egg results. Stirring must be of a gentle nature to prevent aeration of the egg during the mixing. This emulsion is preferably pasteurised at a temperature not in excess of 60° C.

Although it is advantageous that the hydrophilic emulsifier shall always preponderate, nevertheless the proportions given above can be varied within fairly wide limits; for example the glyceryl monostearate may vary between 30–75 grms. leaving the other constituents the same, or the glyceryl dioleate may vary between 8–25 grms. leaving the other constituents the same, or any proportion between the said limits in one combined with any proportion between the limits of the other. In the example the four emulsifiers total 92 grms. and according to the foregoing limits they could total 45 grms. up to 107 grms. The quantity of water is given as 800 mls. because in the example this produced a viscosity of the emulsifier approximating to that of the liquid egg under the prevailing ambient temperature conditions; any quantity of water sufficient to produce a viscosity of the colloidal suspension of the mixed emulsifiers which matches approximately that of the batch of liquid egg at the moment under treatment will be suitable. The second hydrophilic emulsifier included in the example (viz: propylene glycol) is included as it is comparatively powerful in preventing removal of water of crystallization during drying in comparison with other hydrophilic emulsifiers.

Example 2

An emulsifying agent is prepared by making an emulsion of the following constituents:

| | | |
|---|---|---|
| Glyceryl monostearate (self-emulsifying) | grms | 65 |
| Glyceryl dioleate | grms | 20 |
| Water | mls | 800 |

This is similar to Example 1 but the intermediate emulsifier polyoxyethylene sorbitan mono-oleate and the extra hydrophilic emulsifier propylene glycol is omitted. The glyceryl esters are melted together, as before, and the procedure follows as with Example 1.

*Example 3*

An emulsifying agent is first prepared by making an emulsion of the following constituents:

| | |
|---|---|
| Glyceryl mono-oleate (self-emulsifying) ____grms__ | 65 |
| Sorbitan dioleate _____grms__ | 20 |
| Water _____mls__ | 800 |

The two esters are melted together, the water added and the further steps carried out as in Example 1.

The emulsified egg may be poured on to shallow trays to a uniform depth of about 1 inch to 1½ inches and these placed in a blast or other freezer for several hours, being subjected to about −40° C. freezing, following which the moisture is removed under vacuum which is when the actual drying occurs.

It has been found that the emulsifiers used according to the invention impart other desirable qualities to the egg. For example the glyceryl monostearate and propylene glycol have an effect on the crystallization which takes place when the liquid egg is frozen. Normally the frozen block is built up of comparatively large crystals with the attendant disadvantage that a relatively large amount of heat is necessary to dehydrate the crystals. The foregoing emulsifiers have the effect of reducing the crystal size and thus producing a larger number of smaller crystals with the consequence that the amount of heat necessary for removing the water from the frozen mass can be reduced, and the avoidance of excessive heat contributes to the general object of the invention.

We claim:
1. A process for the preparation of dried egg by freeze-drying liquid egg emulsion which consists in
   (1) mixing liquid whole eggs until the yolks and whites are completely mixed;
   (2) adding to said mixture, an emulsifying agent consisting of a mixture of at least one mainly hydrophilic emulsifier and at least one mainly lipophilic emulsifier, the said hydrophilic and lipophilic emulsifiers being in aqueous emulsion, said hydrophilic emulsifier being a mixture of monoglyceryl ester with a polyhydric alcohol and said lipophilic emulsifier being a diester selected from the group consisting of glyceryl diester and sorbitan diesters;
   (3) freeze-drying the resulting liquid egg emulsion; and
   (4) recovering the dried egg so produced.

2. A process according to claim 1 in which the hydrophilic emulsifier is glyceryl monostearate self-emulsifying with a proportion of proylene glycol.
3. A process according to claim 1 in which the lipophilic emulsifier is a dioleate.
4. A process according to claim 1 in which an intermediate emulsifier having fairly balanced hydrophilic and lipophilic properties is used as a constituent of the emulsifying agent as a bridge to promote affinity between the hydrophilic and lipophilic emulsifiers.
5. A process according to claim 1 in which the emulsifying agent is used in the proportion of from 45 to 107 grammes added to 13.5 kilogrammes of liquid egg.
6. A process according to claim 1 in which the emulsifying agent is used in the proportion of from 45 to 107 grammes added to 13.5 kilogrammes of liquid egg and in which the said emulsifying agent comprises between 35 and 80 parts by weight of a mainly hydrophilic emulsifier to 8–25 parts by weight of a mainly lipophilic emulsifier and up to 2 parts by weight of an intermediate emulsifier.
7. A process according to claim 1 in which, in the preparation of the emulsifying agent, the water added to produce an aqueous emulsion is added when just below its boiling point with rapid stirring, the emulsion then being cooled with constant stirring, and added to the liquid egg with constant stirring which is insufficient to cause aeration of the egg.
8. A process for the preparation of dried egg consisting of the process for producing liquid egg according to claim 7, then pouring the emulsified liquid on to trays and freezing the same, then removing the moisture under vacuum.

References Cited by the Examiner

UNITED STATES PATENTS

| | | | |
|---|---|---|---|
| 2,142,511 | 1/1939 | Harris et al. _____ | 99—113 X |
| 2,176,080 | 10/1939 | Katzman _____ | 99—113 |
| 2,555,466 | 6/1951 | Bogin et al. _____ | 99—210 X |
| 2,569,527 | 10/1951 | Johnston _____ | 99—118 X |

OTHER REFERENCES

Griffin: The American Perfumer, May 1955, pages 26 to 29.

A. LOUIS MONACELL, *Primary Examiner.*

L. M. SHAPIRO, *Assistant Examiner.*